US006494405B1

(12) United States Patent
Kirn et al.

(10) Patent No.: US 6,494,405 B1
(45) Date of Patent: Dec. 17, 2002

(54) PEAR COMPOSITES FOR OXYGEN SYSTEMS

(75) Inventors: Elizabeth P. Kirn, Forth Worth, TX (US); Neil Anthony Graf, River Ridge, LA (US); Kevin Wilbur Ely, Huntsville, AL (US)

(73) Assignee: Lockheed Martin Corporation, New Orleans, LA (US)

( * ) Notice: Subject to any disclaimer, the term of this patent is extended or adjusted under 35 U.S.C. 154(b) by 0 days.

(21) Appl. No.: 09/309,780

(22) Filed: May 11, 1999

Related U.S. Application Data

(60) Provisional application No. 60/084,986, filed on May 11, 1998, provisional application No. 60/084,987, filed on May 11, 1998, provisional application No. 60/084,988, filed on May 11, 1998, provisional application No. 60/084,989, filed on May 11, 1998, provisional application No. 60/084,990, filed on May 11, 1998, provisional application No. 60/084,991, filed on May 11, 1998, and provisional application No. 06/084,992, filed on May 11, 1998.

(51) Int. Cl.[7] .................... B21D 35/00

(52) U.S. Cl. .................... 244/158 R; 244/133; 244/135 R; 220/456

(58) Field of Search .................... 244/36, 158 R, 244/133, 135 R; 220/414, 456, 458, 461, 590, 454; 62/45.1, 56.7, 293

(56) References Cited

U.S. PATENT DOCUMENTS 3,261,571 A * 7/1966 Pinnes .................... 244/172
3,938,346 A * 2/1976 Ovchinnikov et al. .... 220/91 G
H943 H * 8/1991 Garvey .................... 220/456
5,150,812 A * 9/1992 Adams .................... 220/456
5,175,241 A * 12/1992 Darrow .................... 528/353
5,376,200 A * 12/1994 Hall .................... 220/414
5,380,768 A 1/1995 Cranston et al. ............ 521/167
5,400,602 A * 3/1995 Chang et al. ................ 62/50.7
5,403,537 A 4/1995 Seal et al. .................. 264/511
5,419,139 A 5/1995 Blum et al. .................. 62/45.1
5,901,557 A * 5/1999 Grayson .................... 62/50.1
5,994,418 A * 11/1999 Weiser et al. ................ 521/56
6,013,361 A * 1/2000 Seal et al. ............... 428/297.4

FOREIGN PATENT DOCUMENTS

WO WO97/28401 8/1997
WO WO97/18081 5/1998

* cited by examiner

*Primary Examiner*—Galen L. Barefoot
(74) *Attorney, Agent, or Firm*—Garvey, Smith, Nehrbass & Doody, L.L.C.; Charles C. Garvey, Jr.; Seth M. Nehrbass

(57) ABSTRACT

The development of polymer composite liquid oxygen (LOX) tanks is a critical step in creating the next generation of launch vehicles. A composite LOX tank will weigh significantly less than conventional metal tanks. This benefit of reduced weight is critical to enable future launch vehicles to meet required mass fractions. The high strength and low weight of a composite tank allows for a lighter weight craft and/or higher payload capacity which results in lower costs per pound to place an object in orbit. The unique, nontraditional idea described here is to use resin-based composite materials to make such a composite tank or other oxygen carrying component such as a feedline. Polymer composites have traditionally been regarded as being more flammable than metals and therefore deemed not oxygen compatible. However, PEAR (polyether amide resin) composites, due to their low flammability and high toughness, could be made into liquid oxygen tanks.

46 Claims, 6 Drawing Sheets

26

PEAR COMPOSITES FOR OXYGEN SYSTEMS

CROSS-REFERENCE TO RELATED APPLICATIONS

U.S. Provisional Patent Application Serial Nos. 60/084,986; 60/084,987; 60/084,988; 60/084,989; 60/084,990; 60/084,991; 60/084,992; all filed May 11, 1998, are incorporated herein by reference.

STATEMENT REGARDING FEDERALLY SPONSORED RESEARCH OR DEVELOPMENT

The inventions described herein were initiated in the performance of work under Lockheed Martin Michoud Space Systems under IRAD M-28D.

REFERENCE TO A "MICROFICHE APPENDIX"

Not applicable

BACKGROUND OF THE INVENTION

1. Field of the Invention

The present invention relates to tanks for liquid oxygen. More particularly, the present invention relates to composite tanks for liquid oxygen.in which the composite materials include resins whose chemical structure contains ether and amide chemical groups.

2. General Background of the Invention

The following U.S. Patents are incorporated herein by reference: U.S. Pat. Nos. 5,056,367; 5,251,487; 5,380,768; 5,403,537; 5,419,139; and all references cited in those patents.

The following international applications published under the PCT are incorporated herein by reference: International Publication Nos. WO 97/18081 and WO 97/28401 and all references cited in those publications.

A fiber-reinforced composite is defined as a material consisting of fibers of high strength and modulus embedded in or bonded to a matrix with distinct interfaces or boundaries between them. In this form, both fibers and matrix retain their physical and chemical identities, yet they produce a combination of properties that cannot be produced by either constituent alone. In general, fibers are the principal load carrying members, while the surrounding matrix keeps them in desired location and orientation, transfers loads between fibers, and protects the fibers. The matrix material may be a polymer, a metal, or a ceramic. This patent focuses on polymer matrix composites.

The fibers can be made from a variety of materials. These materials include glass, graphite or carbon, polymers, boron, ceramics, or metals. Glass fibers include E-glass (electrical) and S-glass (structural) types. Carbon fibers include those made from different precursors, such as polyacrylonitrile (PAN) or pitch. Polymer fibers include, but are not limited to, aramid (Kevlar®), polyethylene (Spectra®), or PBO (Zylon®). Ceramic fibers may include silicon carbide (SiC) or aluminum oxide ($Al_2O_3$).

For cryogenic tanks, the preferred matrix material is a polymer. The preferred fiber is carbon fiber, more preferably PAN-based fibers, more preferably high strength (over 500 ksi) and high modulus (over 30 Msi) fibers. The most preferred fibers are ultra high modulus fibers (over 60 Msi), specifically M55J fiber by Toray.

The development of polymer matrix composite liquid oxygen tanks is a critical step in creating the next generation of launch vehicles. Future reusable launch vehicles need to minimize the gross liftoff weight (GLOW) by reducing the dry mass fraction. The (dry) mass fraction is the weight of the launch vehicle without fuel divided by the weight of the vehicle with fuel. FIG. 1 is graph showing the effect of mass fraction on GLOW. Indicated on the graph is the RLV mass fraction target region as well as the mass fraction of the RLV without the weight reduction that composites could provide. It is clear that composite tanks are critical to enable future launch vehicles to meet required mass fractions.

The required mass fraction is possible due to the reduction of weight that composite materials can provide. Traditional oxygen tanks are usually made from metals. The space shuttle external tank (ET) has historically been made from 2219 aluminum and more recently 2195 aluminum/lithium alloy. FIG. 2 shows a comparison between these two aluminum alloys and a typical composite material for a liquid oxygen tank for a launch vehicle. The chart shows that a composite tank provides up to 41% and 28% weight savings when compared to 2219 and 2195 aluminum tanks, respectively.

In addition to meeting the required mass fraction, a liquid oxygen tank must be compatible with oxygen. The ASTM definition for oxygen compatibility is the "ability of a substance to coexist with both oxygen and a potential source(s) of ignition within the acceptable risk parameter of the user." It is imperative that materials are selected that will resist any type of detrimental, combustible reaction when exposed to usage environments. Typically, non-metallic materials are not used in these applications because most are easily ignited in the presence of oxygen. However, there are some polymeric materials with inert chemistries that may be used for this application and resist ignition. These chemistries were evaluated by fabricating coupons and testing them with various ignition mechanisms in the presence of liquid and gaseous oxygen. The testing performed reflected situations in launch vehicles that could be potential sources of ignition in composite. These tests included pressurized mechanical impact, particle impact, puncture, puncture of damaged, oxygen-soaked samples, electrostatic discharge, friction, and pyrotechnic shock.

Applications include liquid oxygen for future launch vehicles, such as the Lockheed Martin Reusable Launch Vehicle (RLV). They could also potentially be used in other aerospace applications, including but not limited to, RFP (rocket fuel propellant) tanks and crew vehicle cabins. Other industries that may be interested in composite oxygen tanks include the air handling and medical industries. The ability to resist ignition may also be useful in chemical storage tanks and NGV (natural gas vehicle) tanks.

BRIEF SUMMARY OF THE INVENTION

The apparatus of the present invention solves the problems confronted in the art in a simple and straightforward manner. What is provided are composite tanks for liquid oxygen. The unique, nontraditional concept explored herein is to use fiber-reinforced PEAR composites to create liquid oxygen tanks. A PEAR material is one that is characterized by multiple ether and amide groups or linkages. An amide group is an organic group of atoms that is derived from a carboxylic acid and an amine. Ether is defined as any of a class of organic compounds structurally related to water in which hydrogen atoms have been replaced by organic groups. See FIG. 3 for a reaction that produces ether and amide linkages.

Generally, there are two types of PEAR resins: hot melt and solution.

Several types of resins and composites have been subjected to an extensive battery of tests for their sensitivity to reaction in the presence of oxygen. Historically, the approach was to test the material in the standard mechanical impact test in liquid oxygen (LOX). If the material had an impact threshold of 72 foot-pounds, it was acceptable for use in oxygen environments, such as launch vehicle LOX tanks. If the material's threshold was less than 72 foot-pounds, it typically was not used. Due to limitations in the testing as well as differences in the material structures between metals and composites, standard high strength composite materials have not been able to pass at this level at typical RLV tank wall thicknesses. The approach taken here, which was developed in conjunction with NASA, was to use the standard mechanical impact test to rank composites with respect to each other. Furthermore, an evaluation of the compatibility of composites in oxygen environments would only be determined after testing composite materials with respect to specific ignition mechanisms while in the presence of oxygen. The ignition mechanisms tested included pressurized mechanical impact, particle impact, puncture, puncture of damaged, oxygen-soaked samples, electrostatic discharge, friction, and pyrotechnic shock. If the material could withstand ignition in these environments, it could possibly be considered oxygen compatible.

Several PEAR materials are undergoing evaluation in the standard mechanical impact test. It is expected to do well in liquid oxygen testing due to its high flammability resistance. See FIG. 4 for a comparison of PEAR resin to a typical epoxy.

Another critical parameter for a composite tank is the ability to withstand repeated temperature changes (thermal cycles) without microcracking. One factor that contributes to microcrack resistance is toughness. PEAR resin is tougher than most standard epoxies. See FIG. 5. One effect of thermal cycling is a loss of mechanical properties. FIG. 6 shows how thermal cycling does not effect performance of PEAR materials.

The composite tanks can be made in accordance with any of the methods disclosed in any reference incorporated herein by reference. The invention could be made, for example, using the method of U.S. Pat. No. 5,403,537.

The interior of the tanks disclosed herein typically have a volume of at least 1 liter, more often at least one gallon, and usually have a volume sufficient to allow their use to contain liquid oxygen for typical aerospace applications.

A mechanical impact of at least 10+ ft-lbs at around −300 degrees F. (at around −350 degrees F. when densified oxygen (slush oxygen) is contained in the tank) is Preferred, but is not a requirement. Historically materials have been required to pass the Lox mechanical impact test at 72 ft-lbs or otherwise be shown to be safe for use in application. Lox compatible composite materials have demonstrated the ability to resist combustion when subjected to any potential ignition source. For a composite tank, realistic potential ignition sources were determined to include, but are not limited to mechanisms such as pyrotechnic shock, friction, puncture, electrostatic discharge, and particle impact. These tests are taken to extreme levels. For example, in the puncture test, a is sharpened serrated spike pierced a composite material while submerged in Lox without igniting the composite. This same puncture test has ignited Titanium, a material that is not oxygen compatible, and does not ignite aluminum. The pyrotechnic shock test was also an extreme test in that composites were placed in Lox and subjected to shock loads equivalent to existing metallic Lox tanks such as that on the External Tank. The friction test was extreme in that the composites were abraded to dust with a drill bit in pure oxygen without ignition. In the electrostatic discharge test, composites were subjected to energies that could far exceed any instrumentation or static build up; specifically, these composites do not ignite when subjected to 112.5 Joules from 5000 Volts.

The composite feedline of the present invention preferably has an inner diameter of around 1'to 36'.

As used herein, "form of fiber" means uni-directional tape, slit tape, tow, fabric, woven fabric, chopped fiber, or felt.

BRIEF DESCRIPTION OF THE SEVERAL VIEWS OF THE DRAWINGS

For a further understanding of the nature, objects, and advantages of the present invention, reference should be had to the following detailed description, read in conjunction with the drawings, wherein.

DETAILED DESCRIPTION OF THE INVENTION

Figure 9:
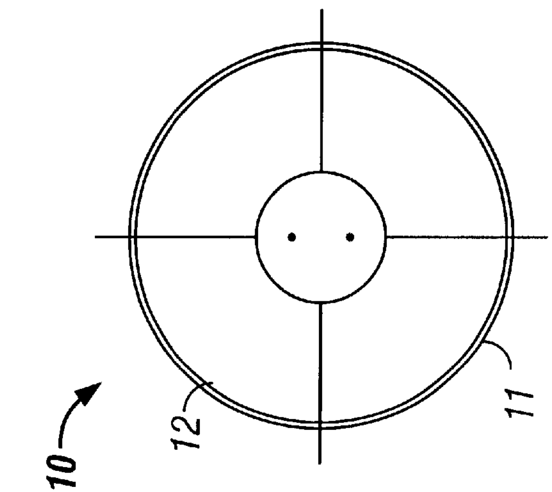
FIG. 9 is an end view of the tank of FIG. 8.
Figure 8:
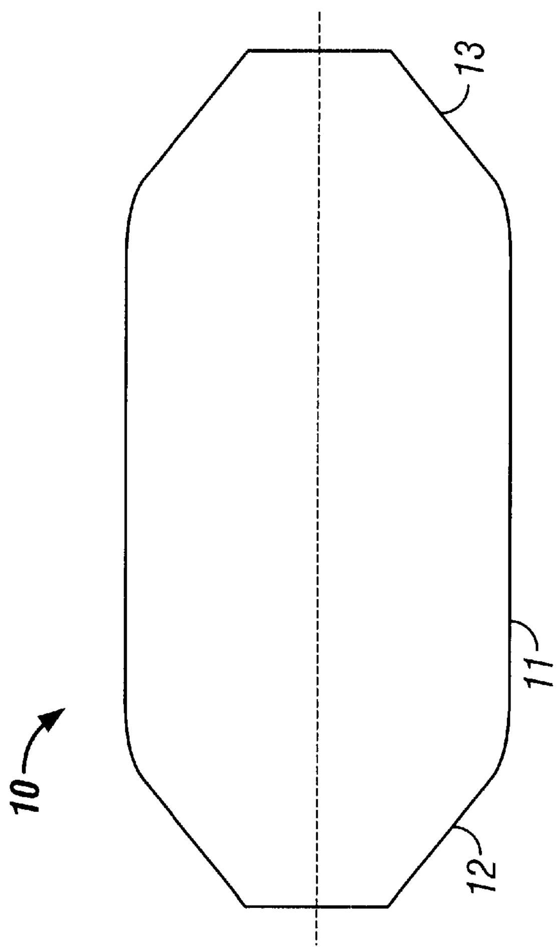
FIG. 8 is a side view of the preferred embodiment of the apparatus of the present invention shown in a cylindrical tank general configuration.

FIGS. 8–9 show the preferred embodiment of the apparatus of the present invention designated generally by the numeral 10. The shape of a composite L02 tank is not limited to, but may be any of the following: cylindrical, spherical, ogived, multi-lobe, or conformal. Composite L02 tanks may be part of but are not limited to any of the following launch vehicles types: lifting body or winged body. A composite tank may also be part of a separate stage such as the External tank of the spare shuttle.

Figure 10:
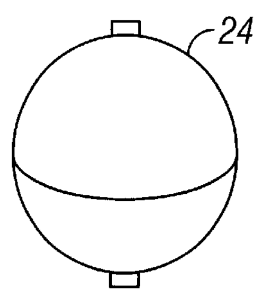
FIG. 10 is a perspective view of the preferred embodiment of the apparatus of the present invention showing a spherical tank.

A spherical tank 24 is simply a sphere as shown in FIG. 10. Tank 24 can have a diameter of between about 1–150 feet.

Figure 11:
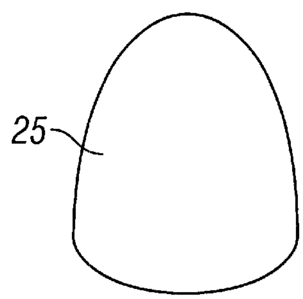
FIG. 11 is a perspective view of the preferred embodiment of the apparatus of the present invention showing an ogived tank.

An ogived tank 25 is a tank with an ogive shape along its sides. The sides can measure between about 1 and 150 feet wide or about 3 and 150 feet high. An example of an ogive tank 25 is the external Tank L02 tank. FIG. 11 depicts a sketch of this concept.

Figure 19:
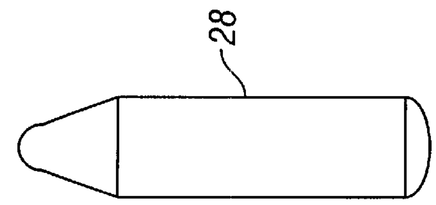
FIG. 19 is a perspective of the preferred embodiment of the apparatus of the present invention showing a cylindrical stage, external tank type.
Figure 18:
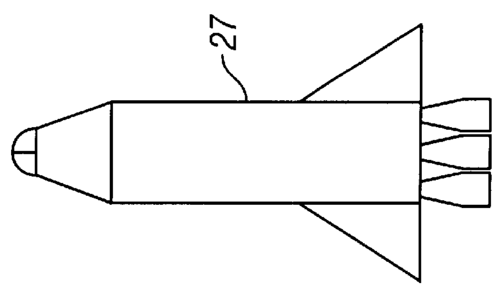
FIG. 18 is a perspective of the preferred embodiment of the apparatus of the present invention showing a winged body.

Any of the tanks of FIGS. 8–16 may also be part of a winged body vehicle 27 or a cylindrical stage 28 as shown in FIGS. 18 and 19, respectively. Winged body vehicles 27 can be generally cylindrically shaped, with wings on the sides.

A composite L02 may be part of a single stage to orbit vehicle or a multiple stage to orbit vehicle where a multiple stage to orbit vehicle is composed of at least 2 stages.

A cylindrical tank is one that has a basic body as a cylinder 11 as shown in FIGS. 8–9. Domes 12, 13 may be facing outward as shown in FIG. 10, but may also be internal or flat bulkheads capping off a cylinder. In FIGS. 8 and 9, a cylindrical tank 10 is shown having a general configuration that includes a cylindrically shaped side wall 11 and conically shaped dome end portions 12, 13.

Figure 12:
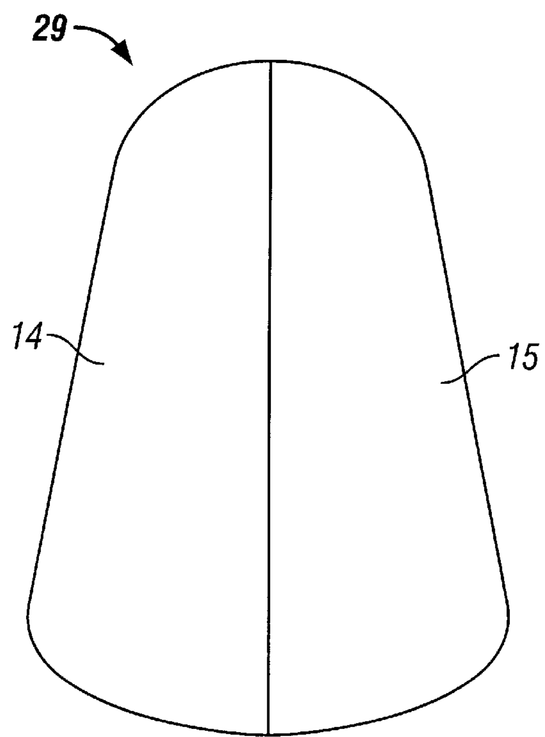
FIG. 12 is plan view of the preferred embodiment of the apparatus of the present invention showing a multi-lobe tank, general configuration.
Figure 14:
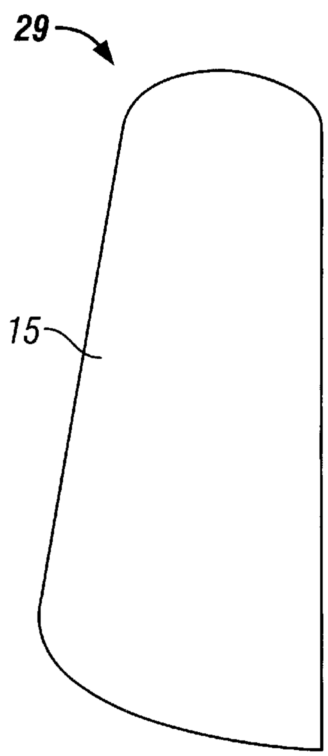
FIG. 14 is a side view of the tank of FIG. 12 and 13.
Figure 13:
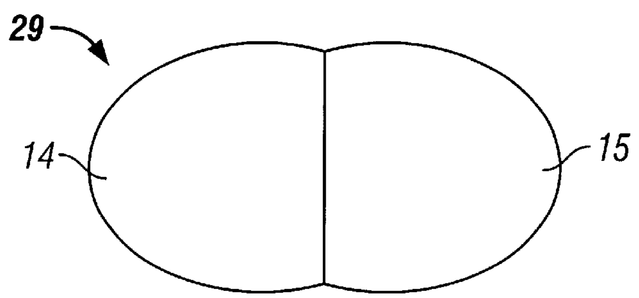
FIG. 13 is an end view of the tank of FIG. 12.

In FIGS. 12–14, the tank apparatus 10 is shown in a multi-lobe tank configuration. A multi-lobe tank 29 will have at least 2 lobes as shown in FIGS. 12–14. A multi-lobe tank may also have more than 2 lobes, but typically no more than 5 lobes. A multi-lobe Lox tank 29 may have one lobe with Lox and the other lobe or lobes may contain other propellants such as LH2. In FIGS. 12–14, two tank lobes 14, 15 are shown. However, it should be understood that though there are a minimum of two lobes in FIGS. 12–14, there may be more lobes for forming tank 10.

Figure 16:
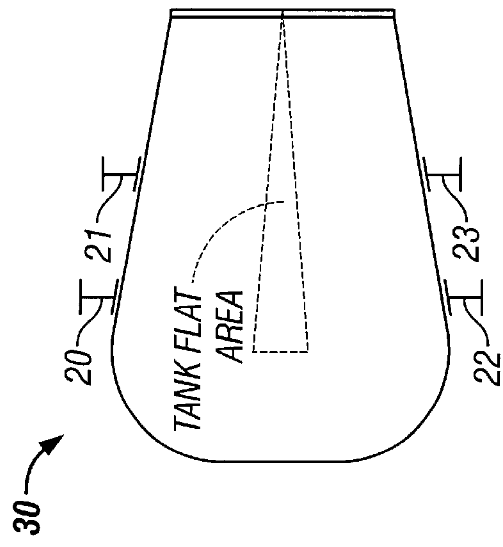
FIG. 16 is a plan view of the tank of FIG. 15.
Figure 15:
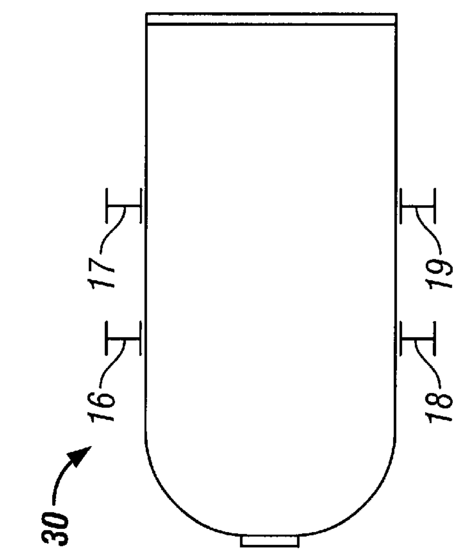
FIG. 15 is a side view of the preferred embodiment of the apparatus of the present invention showing a semi-conformal tank, general configuration.

In FIGS. 15 and 16, a conformal tank 30 is shown mounted between beams including an upper pair of beams 16, 17 and a lower pair of beams 18, 19. Similarly, the tank 10 in FIGS. 15 and 16 can be braced with additional vertically extending beams 20–23. Each of the tanks 10, 24, 25, 29, 30 can have a length of for example 2–150 feet and a maximum transverse dimension of between 2 and 100 feet. In FIGS. 8 and 9, the cylindrically shaped tank provides a diameter of about 1–100 feet and an overall length of about 2–150 feet. The multi-lobe tank 29 of FIGS. 14–16 provides an overall length of between about 4 and 150 feet, a width of 3–100 feet and a height of 2–100 feet.

Figure 17:
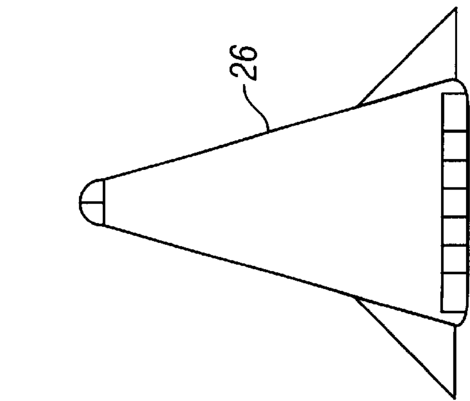
FIG. 17 is a perspective of the preferred embodiment of the apparatus of the present invention showing a lifting body.

A conformal tank 30 is any tank which aims to conform or shape itself to the vehicle inner mold line. Therefore, the shape of a conformal tank 30 will depend upon the vehicle body shape. FIGS. 15–16 show an example of a conformal tank for a lifting body type launch vehicle 26. A lifting body type vehicle 26 is depicted in FIG. 17. The conformal tank 30 of FIGS. 15 and 16 provides an overall length of between about 4 and 150 feet, a width of between 3 and 100 feet, and a height of between about 2–50 feet.

A PEAR tank can be fabricated using either of the uncured composite systems, any appropriate placement method, and any curing process. A listing of each of these systems, placement methods, and curing methods is found below. The best system to use depends on a variety of factors including, but not limited to, tank size and shape, composite material used, and available resources.

Therefore, a decision on the best fabrication process must be made on a case-related basis.

Uncured Composite Systems:

- Prepreg Systems
- "Wet" Resin system.

A prepreg consists of reinforcement, such as graphite, glass, or Kevlar®, which is impregnated with a resin. A wet resin system is one where liquid resin is placed on the reinforcement at the time of manufacture.

Placement Methods for Prepreg Systems:

- Fiber Placement
- Tape Placement
- Filament Winding
- Hand Lay-up

Placement Methods for Wet systems:

- Filament Winding
- Resin Infusion/Resin transfer molding
- Hand Lay-up

Fiber placement is an automated process where a robotic arm with a dispensing head is used to place several pieces of prepreg tow or slit tape, typically approximately 0.125 inches wide by 0.0055 inches thick, onto a mandrel in a desired orientation. Tape placement is a similar automated process, but the placement bead is attached to a gantry rather than a robotic arm, and it places prepreg tape, typically 12 or 14 inches wide, onto the tool or mandrel. Filament winding is a process in which continuous prepreg tow or continuous fiber with wet resin is wound onto a rotating mandrel in a prescribed way. Hand lay-up is when prepreg, usually tape or fabric, or dry material and wet resin is manually applied to a tool or mandrel. Resin infusion or resin transfer molding is where resin is injected or otherwise forced into a dry reinforcement fabric or preform.

Figure 1:
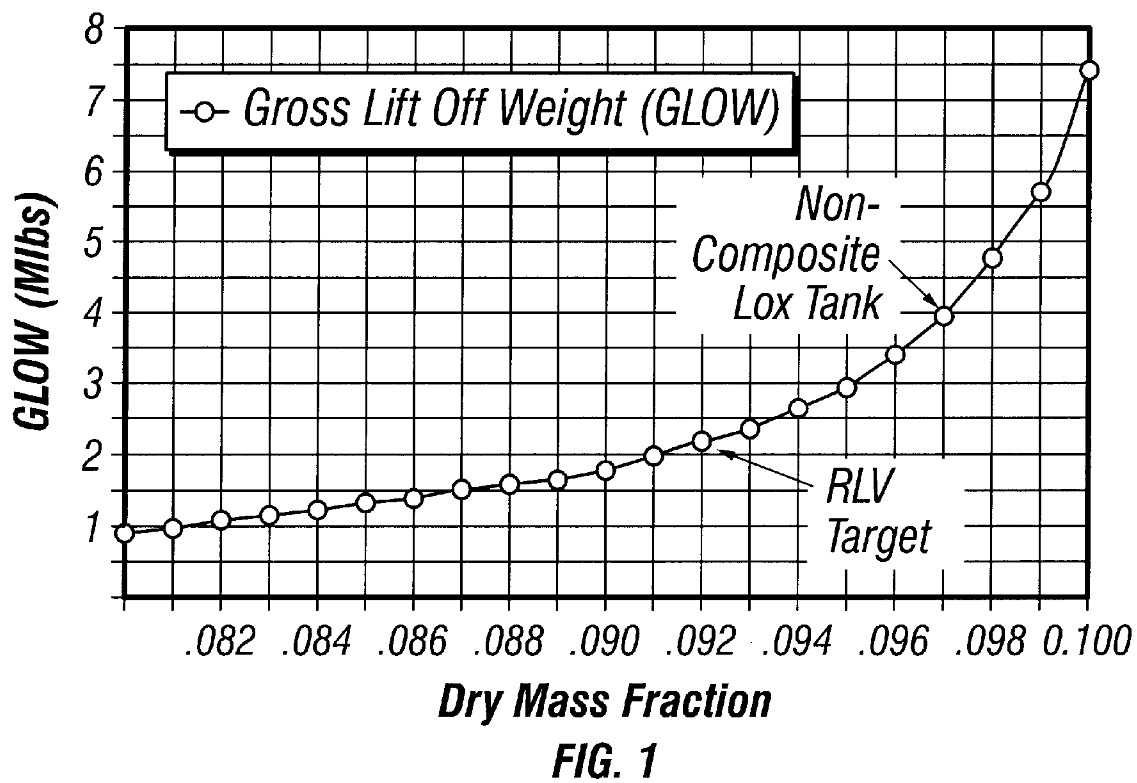
FIG. 1 is a graphical representation of the effect of mass fraction on gross lift off weight.
Figure 2:
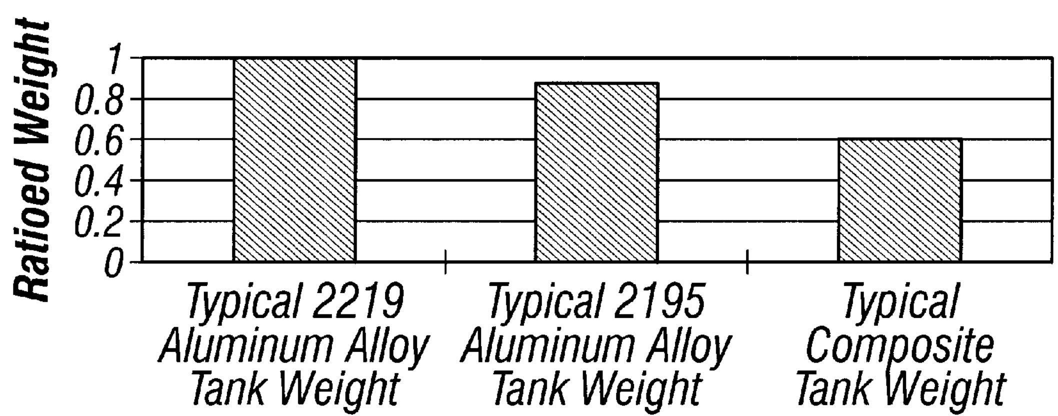
FIG. 2 is a graphical representation of material weight comparison.
Figure 3:
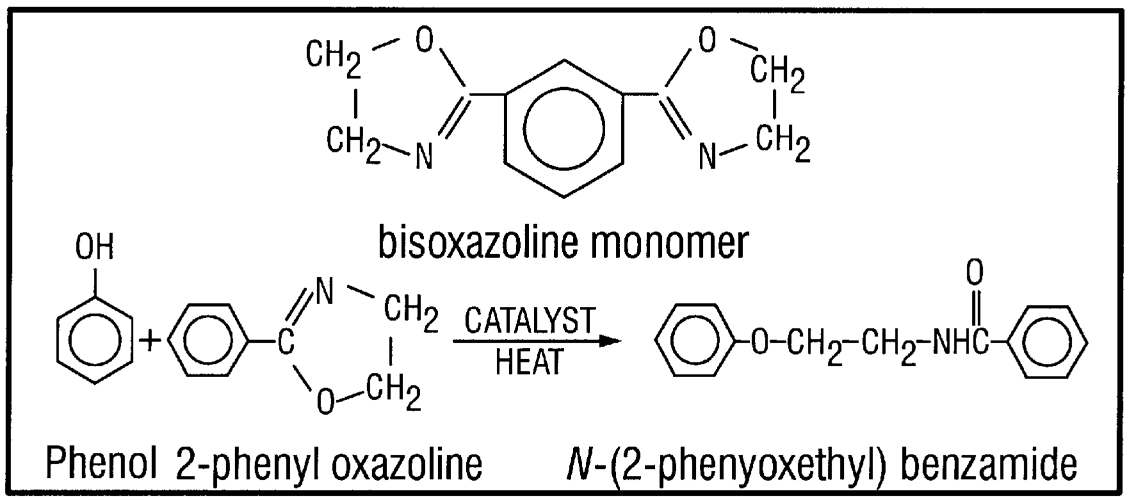
FIG. 3 is a graphical representation of a reaction that produces ether and amide linkages.
Figure 4:
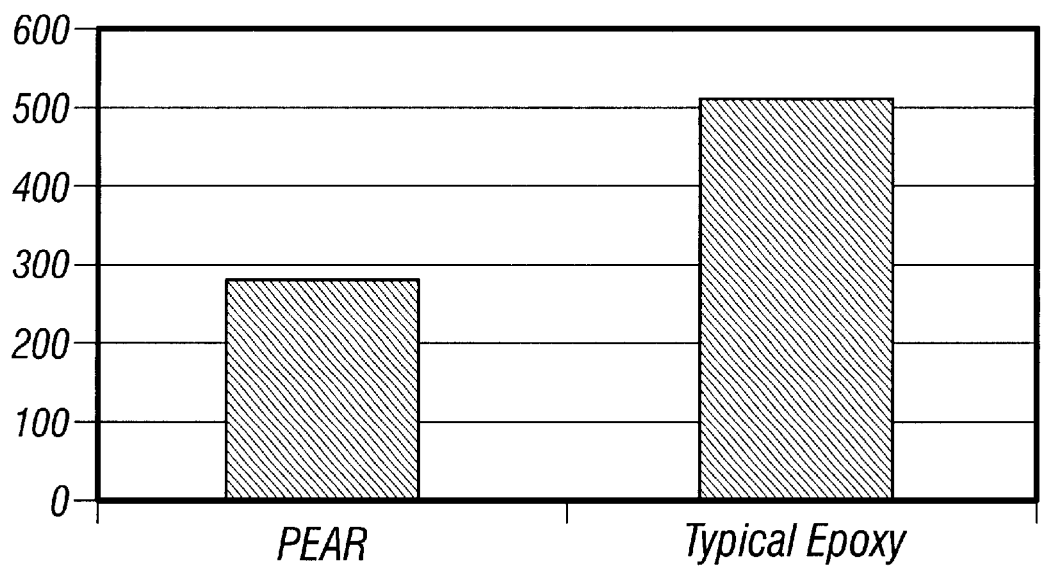
FIG. 4 is a graphical representation of flammability of PEAR vs. epoxy.
Figure 5:
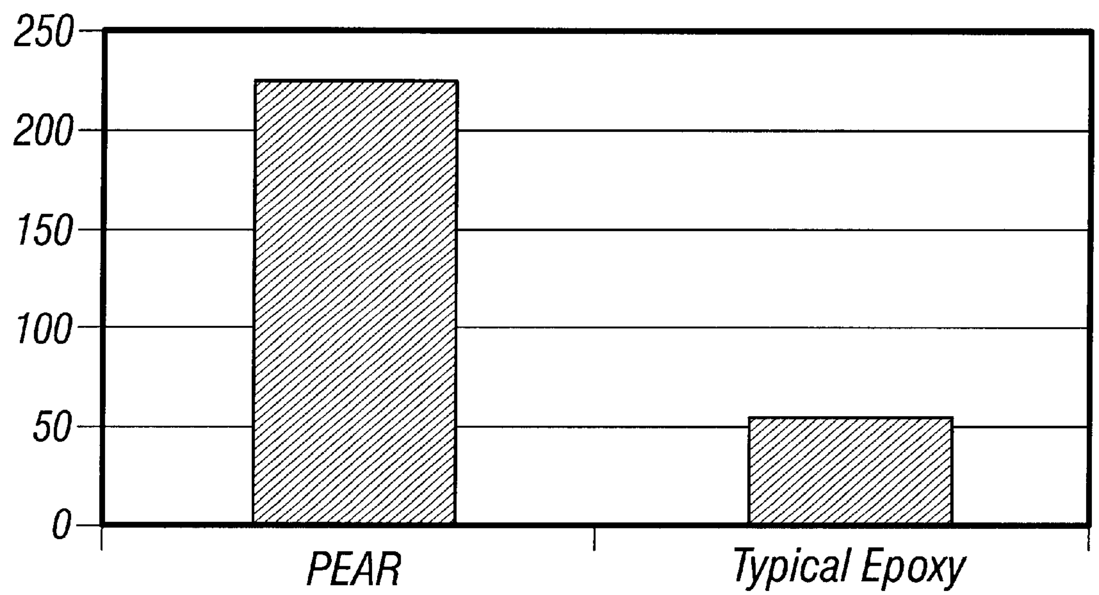
FIG. 5 is a graphical representation of toughness of PEAR vs. epoxy.
Figure 6:
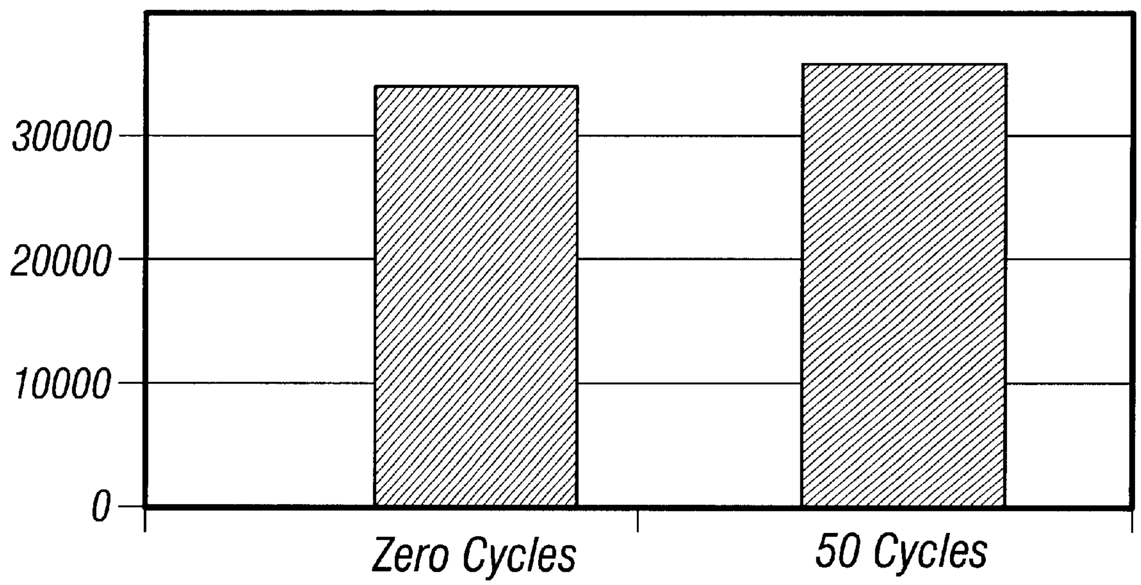
FIG. 6 is a graphical representation showing modulus data after thermal cycling.
Figure 7:
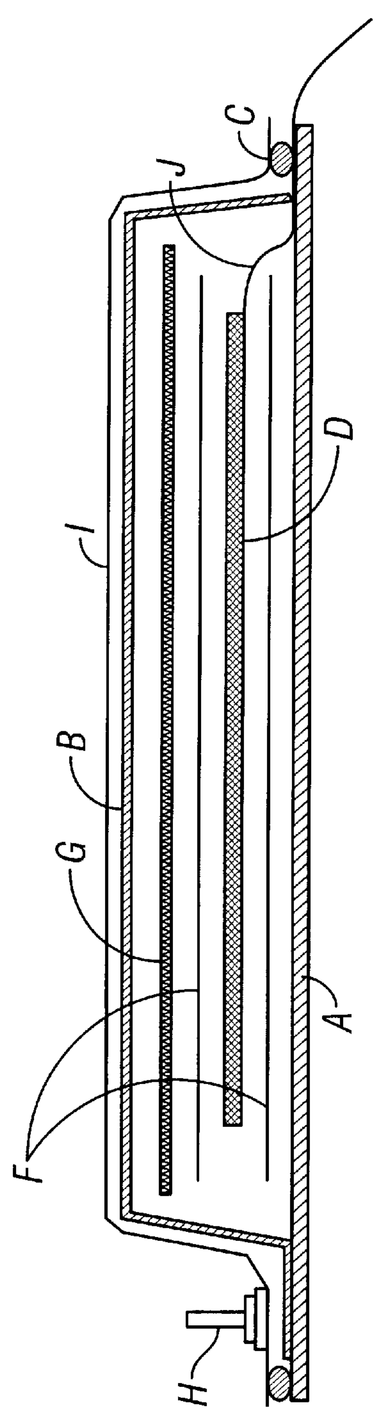
FIG. 7 is a schematic diagram of a halogenated prepreg autoclave vacuum bag.

Curing Processes:

- Autoclave
- Oven Cured (with or without vacuum bag)
- Radiation Cure (such as electron beam)
- In-Situ Cure Curing of a composite material is the application of energy (heat or radiation) and possibly pressure to cause a chemical reaction and form a compact, solid part. The cure method may be any of the following: autoclave (elevated temperature and pressure), vacuum-bag oven cure (elevated temperature and vacuum pressure), oven cure (elevated temperature, ambient pressure), radiation cure (typically ambient temperature and pressure with radiation, such as electron beams or x-ray radiation), or in-situ curing in which the material is cured as it is placed (with for example, heat and mechanical pressure). FIG. 7 illustrates an example of a bagging scheme and autoclave cure, for a PEAR composite. Typical autoclave cycle is 1 hour at 177° C./350° F. at 621 kpa (90 psi) with a post cure at 218° C. (425° F.) postcure.

The following list describes the parts shown in FIG. 7:

A) BASE PLATE: Aluminum, 5/8" thick with no deep scratches or pits. (If surface is damaged, a thin caul plate must be used to provide a smooth tool surface);

B) BREATHER: Airtech Super 10 or Ultraweave 1032;

C) SEALANT TAPE: Schness-Moorehead 5626 or Airtech GS-213;

D) LAMINATE: Lay-up Orientation (example: [0,45,90,-45]2S);

F) RELEASE FILM: Airtech, A4000R Release Film (1 mil);

G) CAUL SHEET: Torr, EL82, 50 DURO, 48" width, .063" Thick;

H) VACUUM COUPLING: 2 required, 1 source & 1 transducer. Minimum of two plies of breather under couplings;

I) VACUUM BAG: Airtech, DP1000 SHTG, 2mil;

J) THERMOCOUPLE: 2 required, opposite edges of laminate, mid ply.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A method of using a composite tank to hold liquid oxygen, comprising:

a) providing a composite tank apparatus, the composite tank apparatus comprising a structural tank body having means for containing liquid oxygen, the tank body having an interior for containing a cryogenic material that has a temperature as low as around minus 300 degrees F., the tank body having a tank wall with an inner surface for contacting liquid oxygen, the tank wall having a composite construction that includes a fiber-reinforccd resin portion made of fiber reinforced PEAR; and b) putting liquid oxygen in the composite tank apparatus, wherein tile fiber reinforced resin portion is directly contacted with liquid oxygen when liquid oxygen is put in the tank, wherein the tank wall has a mechanical impact threshold of at least 10 foot pounds.

2. Apparatus for holding liquid oxygen comprising:

a structural tank body having means for containing liquid oxygen, the tank body having an interior for containing a cryogenic material that has a temperature as low as around minus 300 degrees F., the tank body having a tank wall with an inner surface for contacting liquid oxygen, the tank wall having a composite construction that includes a fiber-reinforced resin portion made of fiber-reinforced PEAR, wherein the Fiber reinforced portion is directly contacted with liquid oxygen when liquid oxygen is put into the tank, and wherein the tank wall has a mechanical impact threshold of at least 10 foot pounds.

3. The invention of claim 2, further comprising oxygen in the tank.

4. Apparatus for transporting liquid oxygen comprising:

a composite feedline having means for transporting liquid oxygen, the feedline having an interior for transporting a cryogenic material that has a temperature as low as around minus 300 degrees F., the feedline having a feedline wall with an inner surface for contacting liquid oxygen, the feedline wall having inner surface a composite construction that includes a fiber-reinforced resin portion made of fiber-reinforced PEAR, wherein the fiber reinforced portion is directly contacted with liquid oxygen when liquid oxygen is put into the tank, and wherein the tank wall has a mechanical impact threshold of at least 10 foot pounds.

5. A liquid oxygen tank apparatus comprising:

a) a tank body having a wall with inner and outer surfaces, the inner surface defining a hollow interior for containing liquid oxygen;

b) the tank wall comprising a composite construction that includes a fiber reinforced PEAR, wherein the fiber reinforced portion is directly contacted with liquid oxygen when liquid oxygen is put into the tank, wherein the tank wall has a mechanical impact threshold of at least 10 foot pounds.

6. The liquid oxygen tank apparatus of claim 5 wherein the mechanical impact threshold is at least 25 foot pounds.

7. The liquid oxygen tank apparatus of claim 5 wherein the mechanical impact threshold is at least 36 foot pounds.

8. The liquid oxygen tank apparatus of claim 5 wherein the mechanical impact threshold is least 72 foot pounds.

9. The liquid oxygen tank apparatus of claim 5 wherein the tank is spherical in shape.

10. The liquid oxygen tank apparatus of claim 5 wherein the tank is a multi-lobe tank.

11. The liquid oxygen tank apparatus of claim 5 wherein the tank is conformal in shape.

12. The liquid oxygen tank apparatus of claim 5 wherein the tank has a length of between 2 feet and 150 feet.

13. The liquid oxygen tank apparatus of claim 5 wherein the tank has a width of between 1 and 100 feet.

14. The liquid oxygen tank apparatus of claim 5 wherein the tank is multi-lobed.

15. The liquid oxygen tank apparatus of claim 5 wherein the tank is generally cylindrically shaped.

16. A liquid oxygen feed line apparatus comprising:

a) a feed line body having a wall with inner and outer surfaces, the inner surface defining a hollow interior for containing liquid oxygen, wherein the fiber reinforced portion is directly contacted with liquid oxygen when liquid oxygen is put into the tank;

b) the feed line wall comprising a composite construction that includes a fiber reinforced PEAR, wherein the feed line wall has mechanical impact threshold of at least 25 foot-pounds.

17. The apparatus of claim 16, wherein the mechanical impact threshold is at least 36 foot-pounds.

18. The apparatus of claim 16, wherein the mechanical impact threshold is at least 72 foot-pounds.

19. The apparatus of claim 16, wherein the mechanical impact threshold is at least 36 foot-pounds.

20. The apparatus of claim 16, wherein the mechanical impact threshold is at least 72 foot-pounds.

21. A launch vehicle comprising:

a) an air frame:

b) an engine;

c) liquid oxygen for fueling the engine;

d) a tank for containing said liquid oxygen, the tank comprising:

i) a tank body having a wall with inner and outer surfaces, the inner surface defining a hollow interior for containing liquid oxygen, wherein the fiber reinforced portion is directly contacted with liquid oxygen when liquid oxygen is put into the tank; and ii) the tank wall comprising a composite construction that includes a fiber reinforced PEAR, wherein the tank wall has a mechanical impact threshold of at least 10 foot pounds.

22. The liquid oxygen tank apparatus of claim 21 wherein the tank is spherical in shape.

23. The liquid oxygen tank apparatus of claim 21 where in the tank is a multi-lobe tank.

24. The liquid oxygen tank apparatus of claim 21 wherein the tank conformal in shape.

25. A liquid oxygen tank apparatus comprising;

a) a tank body having a wall with inner and outer surfaces, the inner surface defining a hollow interior for containing liquid oxygen;

b) the tank wall comprising a composite construction that includes a fiber reinforced PEAR, wherein the fiber reinforced portion is directly contacted with liquid oxygen when liquid oxygen is put into the tank, wherein the tank wall has a modulus of at least 40 msi.

26. The liquid oxygen tank apparatus of claim 25 wherein the modulus is at least 50 msi.

27. The liquid oxygen tank apparatus of claim 25 wherein the modulus is at least 60 msi.

28. The liquid oxygen tank apparatus of claim 25 wherein the modulus is at least 70 msi.

29. A liquid oxygen tank apparatus comprising:

a) a tank body having a wall with inner and outer surfaces, the inner surface defining a hollow interior for containing liquid oxygen;

b) The tank wall comprising a composite construction that includes a fiber reinforced PEAR, wherein the fiber reinforced portion is directly contacted with liquid oxygen when liquid oxygen is put into the tank, wherein the tank wall has a strength of at least 400 ksi.

30. The liquid oxygen tank apparatus of claim 29 wherein the strength is at least 500 ksi.

31. The liquid oxygen tank apparatus of claim 29 wherein the strength is at least 600 ksi.

32. The liquid oxygen tank apparatus of claim 29 wherein the strength is at least 700 ksi.

33. The liquid oxygen tank apparatus of claim 29 wherein the strength is at least 800 ksi.

34. An aerospace launch vehicle including the invention of any one of claims 2–16 and 25–33.

35. A method of using a composite tank to hold liquid oxygen comprising:

providing a composite tank apparatus, the composite tank apparatus comprising a; structural tank body having means for containing LOX, the tank body having an interior for containing a cryogenic material that has a temperature as low as around minus 300 degrees F., the tank body having a tank wall with an inner surface for contacting liquid oxygen the tank wall and inner surface each having a composite construction that includes a fiber-reinforced resin portion that is compatible with liquid oxygen and that includes PEAR; and putting liquid oxygen in the composite tank apparatus, wherein the fiber reinforced portion is directly contacted with liquid oxygen when liquid oxygen is put into the tank, and wherein the tank wall has a mechanical impact threshold of at least 10 foot pounds.

36. The method of claim 35, wherein the fiber-reinforced resin portion directly contacts liquid oxygen when liquid oxygen is put into the composite tank apparatus.

37. The method of claim 35, wherein the tank has a primary component wall system and interior component wall system, the primary component wall system being made of a first resin reinforced with a first fiber, and the interior component wall system including more LOX compatible fiber, more LOX compatible form of fiber, more LOX compatible resin, a more LOX compatible lay-up pattern, a more LOX compatible treatment of tile resin, and/or a resin-rich) surface.

38. Tile method of claim 35, wherein the interior is lined or coated with a material which is more liquid oxygen-compatible than the fiber-reinforced resin.

39. Apparatus for holding liquid oxygen comprising:

a structural tank body having means for containing liquid oxygen, the tank body having an interior for containing a cryogenic material that has a temperature as low as around minus 300 degrees F., the tank body having a tank wall with an inner surface for contacting liquid oxygen, the tank wall having a composite construction that includes a fiber-reinforced resin portion that includes fiber-reinforced PEAR, wherein the fiber-reinforced resin portion directly contacts liquid oxygen when liquid oxygen is put into the composite tank apparatus, wherein the tank wall has a mechanical impact threshold of at least 25 foot-pounds.

40. The invention of claim 39, further comprising oxygen in the tank.

41. The invention of claim 39, wherein the mechanical impact threshold is at least 36 foot-pounds.

42. The invention of claim 39, wherein the mechanical impact threshold is at least 72 foot-pounds.

43. An aerospace launch vehicle including the apparatus of claim 40.

44. Apparatus for transporting liquid oxygen comprising:

a composite feedline having means for transporting liquid oxygen, the feedline having an interior for transporting a cryogenic material that has a temperature as low as around minis 300 degrees F., the feedline having a feedline wall with an inner surface for contacting liquid oxygen, the feedline wall having a composite construction that includes a fiber-reinforced resin portion made of fiber-reinforced PEAR, wherein the feedline wall has a mechanical impact threshold of at least 10 foot pounds.

45. The apparatus of claim 44, wherein the fiber-reinforced resin portion directly contacts liquid oxygen when liquid oxygen is put into the apparatus.

46. An aerospace launch vehicle including the apparatus of claim 45.

* * * * *